United States Patent
Yuen et al.

[11] Patent Number: 6,123,280
[45] Date of Patent: Sep. 26, 2000

[54] FISHING REEL SWITCHABLE STEPLESS ANTI-REVERSE MECHANISM WITH PLUNGER LOCATOR

[75] Inventors: Shu-Cheong Yuen; Chung Cheung, both of Kwai Chung, The Hong Kong Special Administrative Region of the People's Republic of China

[73] Assignee: Heligear Engineering (HK) Co., Ltd., Hong Kong, China

[21] Appl. No.: 09/340,768

[22] Filed: Jun. 28, 1999

[51] Int. Cl.[7] .................................................. A01K 89/02
[52] U.S. Cl. .......................... 242/247; 242/295; 242/302; 188/82.3; 192/45
[58] Field of Search .................................... 242/224, 230, 242/242, 243, 247, 295, 298, 299, 302, 304; 188/82.3, 82.34; 192/45

[56] References Cited

U.S. PATENT DOCUMENTS

| | | | |
|---|---|---|---|
| 4,923,141 | 5/1990 | Sazaki et al. | 242/247 |
| 5,020,738 | 6/1991 | Yamaguchi | 242/298 |
| 5,145,125 | 9/1992 | Morimoto | 242/299 X |
| 5,503,343 | 4/1996 | Hirano et al. | 242/247 |
| 5,547,140 | 8/1996 | Kawabe et al. | 242/247 |
| 5,570,851 | 11/1996 | Yamaguchi et al. | 242/247 |
| 5,593,102 | 1/1997 | Yamaguchi | 242/247 X |
| 5,738,292 | 4/1998 | Kang et al. | |

FOREIGN PATENT DOCUMENTS

| | | | |
|---|---|---|---|
| 2248162 | 4/1992 | United Kingdom | 242/230 |
| 2254534 | 10/1992 | United Kingdom | 242/247 |

*Primary Examiner*—Donald P. Walsh
*Assistant Examiner*—Emmanuel M. Marcelo
*Attorney, Agent, or Firm*—Alix, Yale & Ristas, LLP

[57] ABSTRACT

A switchable anti-reverse mechanism for a fishing reel having an inner assembly which is fixedly mounted to the pinion of the fishing reel. The front end portion of the inner assembly is mounted to the rotor of the fishing reel. An outer assembly includes a housing having a plurality of slots and a cylindrical member having an opening extending coaxially with the pinion axis. The inner assembly is positioned within the opening of the outer assembly. The anti-reverse mechanism also includes means for allowing relative rotation around the pinion axis between the inner and outer assemblies in the line-winding direction and preventing relative rotation between the inner and outer assemblies in a reverse direction which is opposite to the line-winding direction. A plunger is movable along the plunger axis from a lock position to an unlock position, the plunger axis being parallel to the pinion axis. At least a portion of the plunger is disposed within a slot of the outer assembly when the plunger is in the lock position and no portion of the plunger is disposed within a slot of the outer assembly when the plunger is in the unlock position. An actuator is engaged with the plunger for selectively moving the plunger between the lock position and the unlock position.

15 Claims, 4 Drawing Sheets

FISHING REEL SWITCHABLE STEPLESS ANTI-REVERSE MECHANISM WITH PLUNGER LOCATOR

BACKGROUND OF THE INVENTION

This invention relates generally to fishing reels of the type having a rotary element which is rotational in a first direction for reeling in a fishing line onto a spool. More particularly, the present invention relates to mechanisms for selectively preventing rotational movement of the rotary element in a second direction which is opposite to the first direction.

In a spinning reel, the rotary element, a rotor, rotates to draw the fishing line in a wrapping motion around an oscillating spool. In a spincast type fishing reel, a spinner head rotates to perform the same function as the rotor of the spinning reel. Conventional fishing reels generally include an anti-reverse mechanism to limit the reverse movement of the rotary element.

Such conventional anti-reverse mechanisms may include a cooperating ratchet and pawl that prevent the reverse rotation of the rotary element. When the rotary element is advancing in the line-retrieval direction, the pawl is disengaged from the ratchet teeth and runs directly or, indirectly with the rotor. When the rotary element starts to advance in the opposite direction, the pawl is shifted between adjacent ratchet teeth to stop any further reverse movement. This design however provides a relatively large amount of reverse movement, also known as time lagging, before the rotary element can be stopped. This is due to the distance between the teeth of the ratchet. The number of teeth on the ratchet also limits the number of anti-reverse positions which may be provided.

In order to increase the number of anti-reverse positions, one may increase the number of teeth. However, the number of teeth which may be added is limited by the interior spacing of the fishing reel and the resulting teeth are generally smaller and denser. This makes the mechanism much more difficult to produce in order to prevent the pawl slipping from the teeth during the engaging period. The smaller ratchet and pawl is also much easier to damage since the forces produced during line retrieval act on a smaller contact surface between the pawl and the ratchet. In addition, the number of anti-reverse positions is still limited.

To overcome the above problem, some conventional reels use a one-way clutching device to replace the ratchet and pawl. A one-way device generally contains two rotating elements. If any one of the elements is locked up, the other element can only rotate in one direction. Otherwise the whole device can rotate in the opposite direction.

U.S. Pat. No. 5,738,292 discloses a one-way clutching device. The pinion is attached to the inner ring of the one-way device while the rotor is attached to the outer ring of the one-way device. To prevent reverse rotation, a key is inserted transversely to the outer ring. The drawback of this design however is that the one-way device is on the pinion and the pinion is an the main shaft of the fishing reel. The transverse position of the key to the outer rings of the one-way device introduces radical forces acting directly onto the one-way device. These radical forces load all the rotary elements from the outer ring of the one-way device to the main shaft. A series of frictional forces is generated and applied onto all the rotary elements due to the unbalanced side loading. As a result, when the anti-reverse feature is on, both static and dynamic frictions on the rotation of the rotor have been increased.

SUMMARY OF THE INVENTION

Briefly stated, the invention in a preferred form is a switchable anti-reverse mechanism for a fishing reel having a line storing element and means for winding fishing line in one direction onto the line storing element. Typically the means for winding the line includes a rotor which is rotated around the line storing element to wind the line thereon, a hand crank, and a pinion for transmitting motive power from the handcrank to the rotor. The anti-reverse mechanism includes an inner assembly which is fixedly mounted to the pinion of the fishing reel. The front end portion of the inner assembly is mounted to the rotor of the fishing reel. An outer assembly includes a housing and a cylindrical member having an opening extending coaxially with the pinion axis. The inner assembly is positioned within the opening of the outer assembly. The housing has a plurality of slots. The anti-reverse mechanism also includes means for allowing relative rotation around the pinion axis between the inner and outer assemblies in the one direction and preventing relative rotation between the inner and outer assemblies in a reverse direction which is opposite to the one direction. A plunger defines a plunger axis which is parallel to the pinion axis. The plunger is movable along the plunger axis from a lock position to an unlock position, where at least a portion of the plunger is disposed within a slot of the outer assembly when the plunger is in the lock position and no portion of the plunger is disposed within a slot of the outer assembly when the plunger is in the unlock position. An actuator is engaged with the plunger for selectively moving the plunger between the lock position and the unlock position.

Preferably, the housing includes a central hub portion, a front plate portion, a rear surface, and an outer peripheral surface. Each of the slots extends radially outward from the hub portion to the peripheral surface and axially rearward from the plate portion to the rear surface.

The operator portion of the plunger defines a slot having front and rear surfaces. The actuator includes a lock button and a lever having an actuator portion which is received in the slot of the plunger, a mounting portion pivotally mounted to the reel frame and an operator portion engaged by the lock button. The actuator portion may be engaged with either the front or rear surface of the plunger slot to urge the plunger between the lock and unlock positions. The lock button is movable from an on position to an off position. When the lock button is moved to the on position it pushes the operator portion down, pivoting the actuator portion forward about the mounting portion to bias the locking portion of the plunger into a slot of the outer assembly. When the lock button is moved to the off position it pushes the operator portion up, pivoting the actuator portion backward about the mounting portion to bias the locking portion of the plunger out of a slot of the outer assembly.

It is an object of the invention to provide a new and improved anti-reverse mechanism for a fishing reel.

It is also an object of the invention to provide an anti-reverse mechanism for a fishing reel which does not allow time lagging.

It is further an object of the invention to provide an anti-reverse mechanism for a fishing reel that minimizes the frictional forces imposed on the rotary elements of the fishing reel.

Other objects and advantages of the invention will become apparent from the drawings and specification.

BRIEF DESCRIPTION OF THE DRAWINGS

The present invention may be better understood and its numerous objects and advantages will become apparent to those skilled in the art by reference to the accompanying drawings in which.

DETAILED DESCRIPTION OF THE PREFERRED EMBODIMENT

Figure 1:
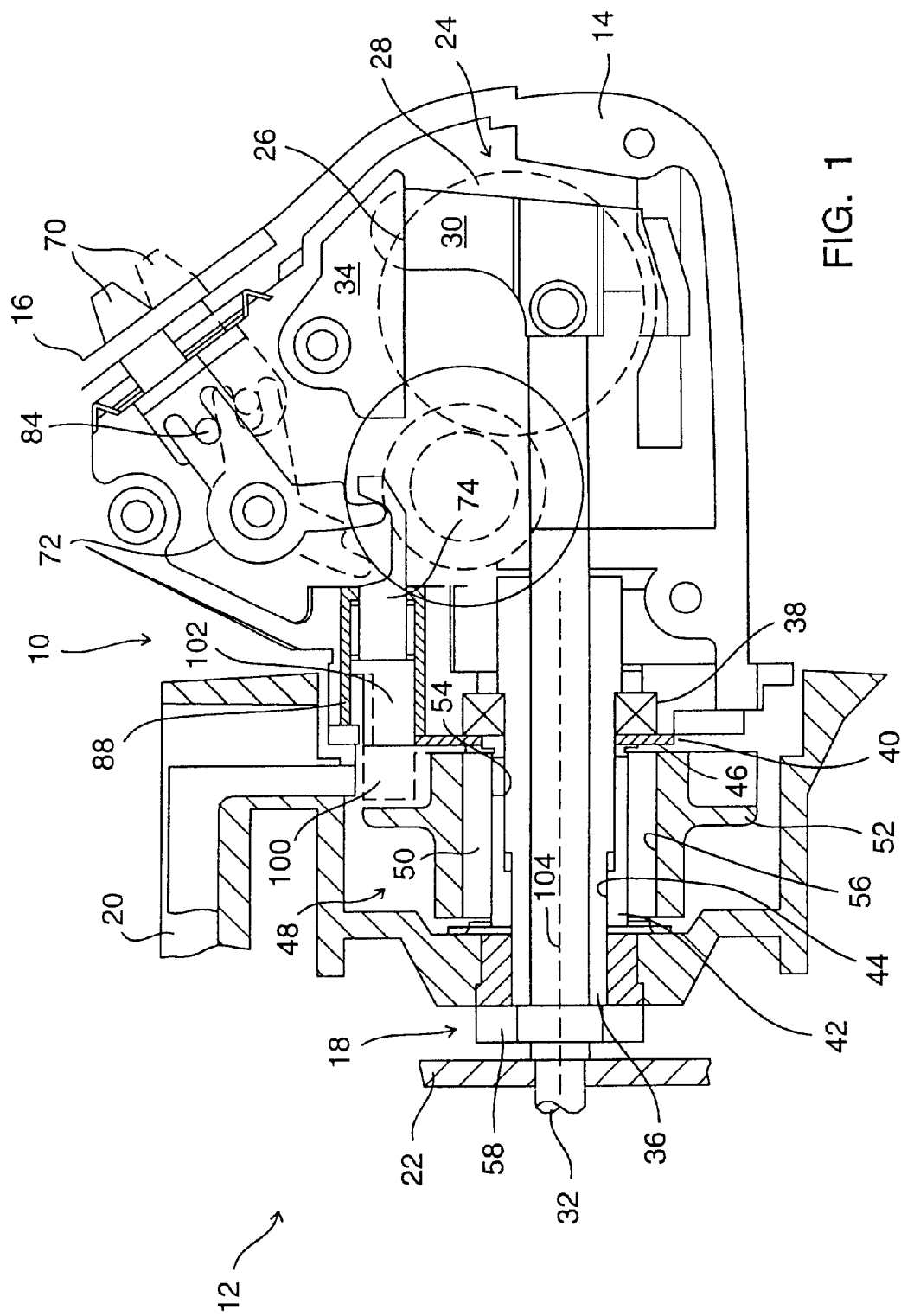
FIG. 1 is a fragmentary, cross-sectional view, partly in phantom, of a spinning fishing reel having an anti-reverse mechanism in accordance with the invention.

With reference to the drawings wherein like numerals represent like parts throughout the several figures, an anti-reverse mechanism in accordance with the present invention is generally designated by the numeral 10. One type of fishing reel that incorporates the anti-reverse mechanism 10 is a spinning type fishing reel 12 (FIG. 1). The fishing reel 12 has a frame 14 that supports and partially encases the driving mechanism and has a mounting stem 16 terminating in a mounting foot (not shown) that can be attached in a conventional manner to a fishing rod (not shown).

The driving mechanism includes a rotator assembly 18, for rotating a rotor 20 to draw fishing line around a spool 22, and an oscillator assembly 24, for reciprocating the spool 22 in a fore and aft direction to evenly distribute the fishing line thereon.

The drive mechanism contains a drive gear 26 that is connected to an oscillation gear 28. An oscillation bracket 30 seats on the oscillation gear 28 and transmits the rotational motion from the oscillation gear 28 into a linear motion on a main shaft 32. An oscillation bracket retainer 34 on the frame 14 helps to maintain the alignment of the oscillation bracket 30 when running with the oscillation gear 28.

The drive gear 26 also drives a pinion 36 that is positioned around the main shaft 32. The pinion 36 seats on a ball race 38 that is held on the frame by a ball race retainer 40. A cylindrical one-way device inner assembly 42 has a longitudinally extending axial opening 44 for receiving the pinion 36. The inner assembly 42 is separated from the ball race 38 by a spacer 46. The one-way device inner assembly 42 locks up with the pinion 36 by cooperating undercuts so they must rotate together.

In a preferred embodiment the one-way device outer assembly 48 comprises an inner cylindrical member 50 and an outer housing 52. The cylindrical member 50 has a longitudinally extending axial opening 54 for receiving the inner assembly 42. The housing 52 has a longitudinally extending axial opening 56 for receiving the inner cylindrical member 50. Frictional engagement between outer surface of the cylindrical member 50 and the inner surface of the housing opening 56 locks the two components together. Alternatively, the outer assembly 48 may be manufactured as a single unitary member.

Figure 5:
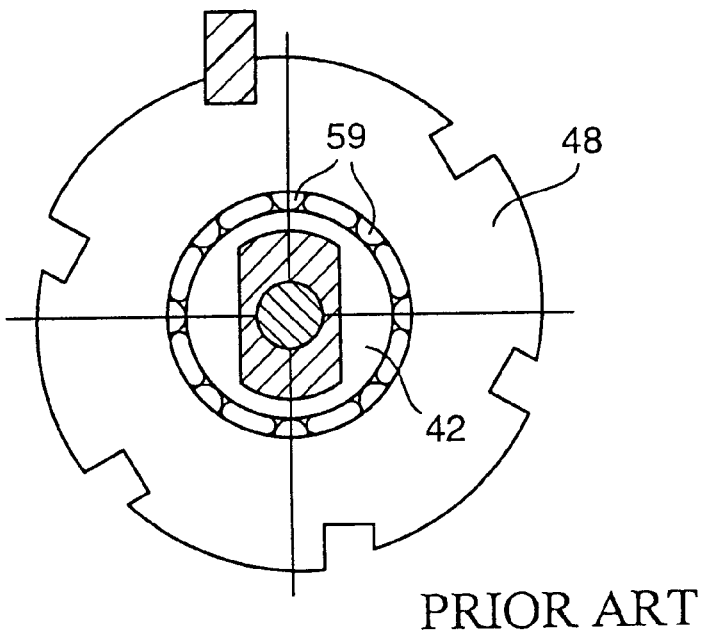
FIG. 5 is a cross-sectional view of a rotor shaft and clutch assembly of a prior art fishing reel.

The rotor 20 is clamped onto the front end portion of the one-way device inner assembly 42 by a rotor nut 58. As a result, the rotor 20 rotates with the one-way device inner assembly 42 when driven by the drive gear 26. The one-way device outer assembly 48 is engaged with the one-way device inner assembly 42 in a manner known in the art such that relative rotation therebetween is permissible only in one direction. For example, a plurality of roller bearings 59 (FIG. 5) disposed in the annular space between the inner and outer assemblies 42, 48 may coact with the inner and outer assemblies 42, 48 in a manner that allows rotation therebetween in only a single direction, as disclosed in U.S. Pat. No. 5,738,292, which is incorporated by reference.

The linear oscillating motion of the main shaft 32 and the rotating motion of the rotor 20 forms the basic motion to wind fishing line onto the spool 22 which is mounted on the main shaft 32.

Figure 2:
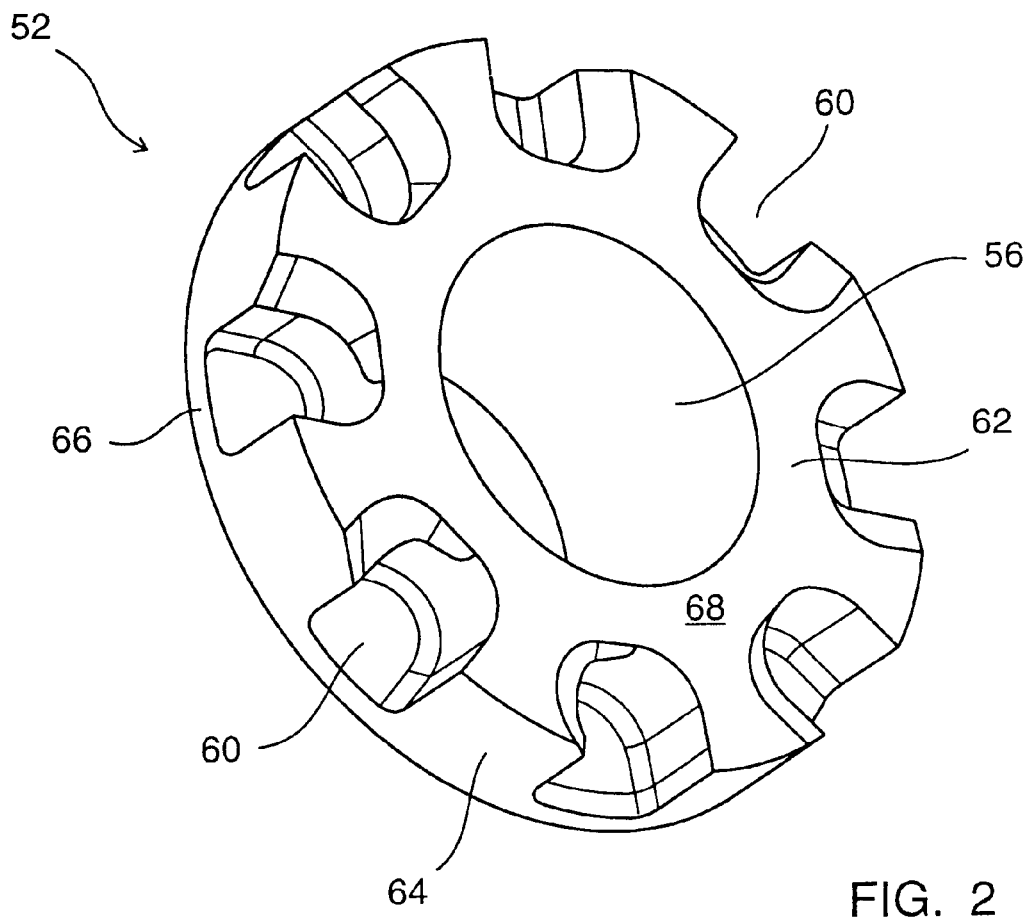
FIG. 2 is an enlarged perspective view of the one-way device housing of the fishing reel of FIG. 1.

With reference to FIG. 2, the one-way device housing 52 has a plurality of equidistantly, circumferentially spaced slots 60. Each slot 60 extends radially outward from a central hub portion 62 of the housing 52 to the outer peripheral surface 64 of the housing 52 and longitudinally backward from a front plate portion 66 of the housing 52 to the rear surface 68 of the housing 52. The housing 52 includes a longitudinally extending axial opening 56 for receiving and engaging the cylindrical member 50, as described above.

Figure 3:
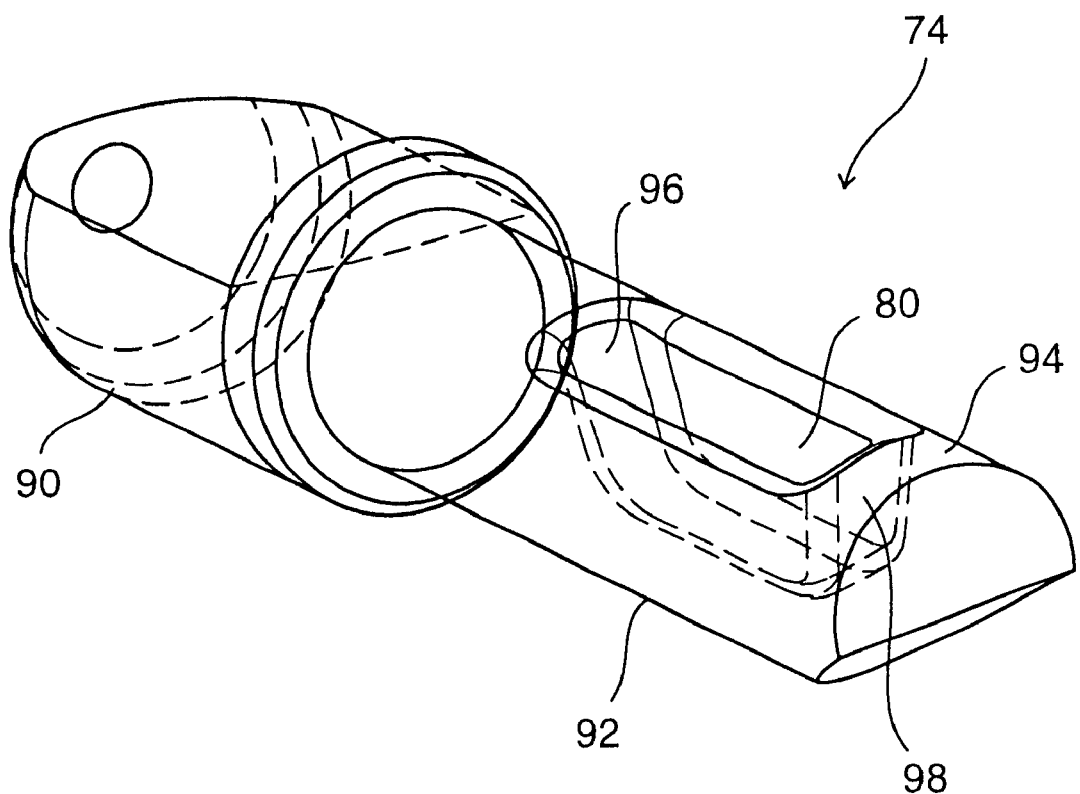
FIG. 3 is an enlarged perspective view, partly in phantom, of the plunger of the fishing reel of FIG. 1.
Figure 4:
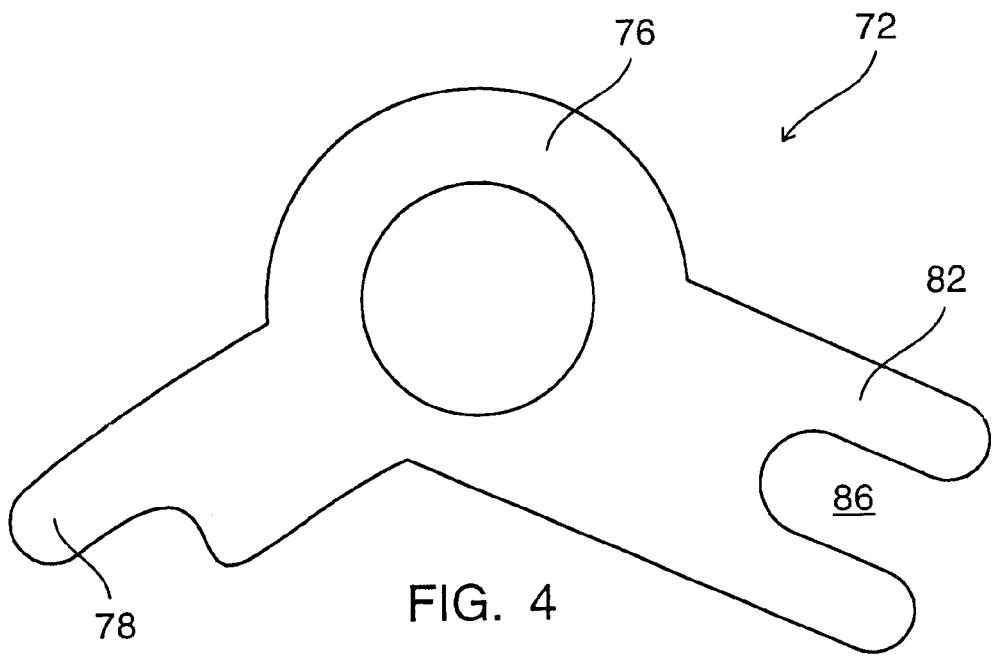
FIG. 4 is an enlarged side view of the lever of the fishing reel of FIG. 1.

With reference to FIGS. 1, 3 and 4, a lock button 70 operates via a lever 72 to position a plunger 74 in one of the slots 60 on the one-way device housing 52 to enable the anti-reverse function. The lever 72 has a middle, mounting portion 76 which is pivotally mounted to the frame 14, a front, actuator portion 78 which is received within a slot 80 in the plunger 74, and a rear operator portion 82. The lock button 70 includes a laterally extending pin 84 which is disposed within a slot 86 in the operator portion 82 of the lever 72. The plunger 74 is slidably mounted within the chamber of a guide 88 which is fixedly mounted to the frame 14. The plunger 74 has a front locking portion 90, which is receivable in the slots 60 of the one-way device housing 52 to enable the anti-reverse function, and a rear operator portion 92. The operator portion 92 of the plunger 74 has a slot 80 extending from the upper surface 94 of the plunger 74. The slot 80 has front and rear engagement surfaces 96, 98 on which the actuator portion 78 of the lever 72 bears to move the plunger 74 from the forward, anti-reverse position 100 (illustrated in dotted-line) to the rearward, reverse-permissive position 102 (illustrated in solid-line).

To actuate the anti-reverse function, the lock button 70 is positioned in the "ON" position. Pin 84 pushes the operator portion 82 of the lever 72 down, pivoting the actuator portion 78 of the lever 72 upward and forward. The actuator portion 78 engages front engagement surface 96 of the plunger 74 and pushes the locking portion 90 of the plunger 74 into a slot 60 in the one-way device housing 52. The positions of the lock button 70, lever 72, and plunger 74 when the anti-reverse function is actuated are illustrated in dotted-line in FIG. 1. The plunger 74 engages with the one-way device housing 52 to prevent it from rotating relative to the frame 14. Since relative rotation between the one-way device inner and outer assemblies 42, 48 is permitted in only a single direction and the one-way device outer assembly 48 and the one-way device housing 52 are locked together, the rotor 20 clamped on the one-way device inner assembly 42 can rotate in one direction only.

It should be noted that the locking portion 90 of the plunger 74 is inserted into slots 60 in a direction which is parallel to the mutual axis 104 of the pinion 36, and inner and outer assemblies 42, 48. Inserting the plunger 74 in the direction parallel to axis 104 has several advantages over inserting a plunger in the direction transverse to the axis 104. One advantage of parallel insertion is that there is very limited perpendicular loading from the plunger 74 onto the rotary elements 42, 48. This minimizes the static and dynamic frictions on the rotary elements 42, 48 when compared with the forces and frictions imposed by inserting the plunger from the transverse direction.

When a reversed rotation of the rotor 20 is required, the plunger 74 is withdrawn from the slot 60 in the one-way device housing 52 by positioning the lock button 70 in the "OFF" position. Pin 84 pushes the operator portion 82 of the lever 72 up, pivoting the actuator portion 78 of the lever 72 downward and rearward. The actuator portion 78 engages rear engagement surface 98 of the plunger 74 and pulls the locking portion 90 of the plunger 74 out of the slot 60 in the one-way device housing 52. The positions of the lock button 70, lever 72, and plunger 74 when the anti-reverse function is not actuated are illustrated in solid-line in FIG. 1. Since the one-way device housing 52 is no longer fixed in relation to the frame 14 of the fishing reel 12, this allows the one-way device inner assembly 42, the one-way device outer assembly 48 and the one-way device housing 52 to rotate together in the reverse direction.

This invention relates to a mechanism that controls rotary units on a fishing reel 12. In one form of the invention it controls the rotation of a rotor 20 on a reel 12 by allowing a switchable anti-reverse function. It should be appreciated that the housing 52 may be eliminated by forming slots 60 in the outer periphery of the unitary one-way outer assembly. It should also be appreciated that the switchable anti-reverse function may be introduced to other rotary parts of the reel other than the rotor 20.

While preferred embodiments have been shown and described, various modifications and substitutions may be made thereto without departing from the spirit and the scope of the invention. Accordingly, it is to be understood that the present invention has been described by way of illustration and not limitation.

What is claimed is:

1. A combination of a switchable anti-reverse mechanism and a fishing reel having a frame carrying a pinion defining an axis, a spool, and a rotor rotatable about the spool for reeling fishing line onto the spool, the anti-reverse mechanism comprising:

an inner assembly fixedly mounted to the pinion of the fishing reel, the inner assembly having a front end portion mounted to the rotor of the fishing reel;

an outer assembly disposed around the inner assembly, the outer assembly having a peripheral portion defining a plurality of slots;

unidirectional rotation means for allowing relative rotation between the inner and outer assemblies in a first direction around the axis of the pinion and preventing relative rotation between the inner and outer assemblies in a second direction which is opposite to the first direction;

a plunger slidably mounted to the frame of the fishing reel, the plunger having a locking portion and an operator portion and being movable along an axis parallel to the pinion axis from a lock position, wherein the locking portion of the plunger is disposed within one of said plurality of slots of the outer assembly, and an unlock position, wherein no portion of the plunger is disposed within one of said plurality of slots of the outer assembly; and actuator means engaged with the plunger for selectively moving the plunger between the lock position and the unlock position.

2. The anti-reverse mechanism of claim 1 wherein the outer assembly comprises a cylindrical member having a longitudinally extending opening for receiving the inner assembly and a housing defining the peripheral portion of the outer assembly.

3. The anti-reverse mechanism of claim 2 wherein the housing includes a central hub portion and an outer peripheral surface, each of the slots extending radially outward from the hub portion to the peripheral surface.

4. The anti-reverse mechanism of claim 3 wherein the housing further includes a front plate portion and a rear surface, each of the slots extending longitudinally rearward from the plate portion to the rear surface.

5. The anti-reverse mechanism of claim 1 wherein the operator portion of the plunger defines a slot having front and rear surfaces and the actuator means includes a lever having an actuator portion which is received in the slot of the plunger and which is alternately engageable with the front and rear surfaces for urging the plunger between the lock and unlock positions, respectively.

6. The anti-reverse mechanism of claim 5 wherein the actuator means further includes a lock button and the lever further includes a mounting portion pivotally mounted to the frame and an operator portion engaged by the lock button, the lock button being movable from an on position, wherein the lock button pushes the operator portion of the lever down, the mounting portion pivots rotating the actuator portion forward, and the actuator portion engages the front surface biasing the locking portion of the plunger into one of said plurality of slots of the outer assembly, to an off position, wherein the lock button pushes the operator portion of the lever up, the mounting portion pivots rotating the actuator portion backward, and the actuator portion engages the rear surface biasing the locking portion of the plunger out of one of said plurality of slots of the outer assembly.

7. The anti-reverse mechanism of claim 6 wherein the operator portion of the lever defines a slot and the lock button includes a laterally extending pin disposed within the slot of the operator portion.

8. The anti-reverse mechanism of claim 1 further comprising a guide fixedly mounted to the frame, the guide defining a chamber for slidably receiving the plunger.

9. A fishing reel comprising:

a line storing element;

line winding means for winding fishing line in one direction onto the line storing element, the line winding means including a rotor engageable with the fishing line and rotatable around the line storing element, hand crank means for providing motive power to rotate the rotor, and pinion means for transmitting the motive power from the handcrank to the rotor, the pinion means including a pinion defining a pinion axis; and an anti-reverse mechanism including:

an inner assembly having a front end portion mounted to the rotor and defining an opening extending coaxially with the pinion axis, the pinion being fixedly mounted within the opening of the inner assembly;

An outer assembly having a peripheral portion defining a plurality of slots and defining an opening extending coaxially with the pinion axis, the inner assembly being disposed within the opening of the outer assembly unidirectional rotation means disposed intermediate the inner and outer assemblies for allowing relative rotation around the pinion axis between the inner and outer assemblies in the one direction and preventing relative rotation between the inner and outer assemblies in a reverse direction which is opposite to the one direction;

a plunger having oppositely disposed locking and operator portions defining a plunger axis which is parallel to the pinion axis, the plunger being movable along the plunger axis from a lock position to an unlock position, wherein the locking portion of the plunger is disposed within one of said plurality of slots of the outer assembly when the plunger is in the lock position and no portion of the plunger is disposed within one of said plurality of slots of the outer assembly when the plunger is in the unlock position; and actuator means engaged with the plunger for selectively moving the plunger between the lock position and the unlock position;

wherein rotation of the outer assembly, the inner assembly, the pinion, and the rotor in the reverse direction is prevented when the plunger is in the lock position and rotation of the outer assembly, the inner assembly, the pinion, and the rotor in the reverse direction is allowed when the plunger is in the unlock position.

10. The fishing reel of claim 9 wherein the outer assembly comprises a housing defining the peripheral portion of the outer assembly and a cylindrical member defining the opening of the outer assembly.

11. The fishing reel of claim 10 wherein the housing has an outer peripheral surface and a rear surface, each of the slots extending radially outward to the peripheral surface and axially to the rear surface.

12. The fishing reel of claim 9 wherein the actuator means includes a lock button and a lever having an actuator portion engaged with the plunger, an operator portion engaged by the lock button, and a mid portion disposed intermediate the actuator and operator portions, the lock button being movable from an on position to an off position, wherein the lock button pushes the operator portion, pivoting the actuator portion about the mid portion to bias the locking portion of the plunger into one of said plurality of slots of the outer assembly when the lock button is positioned in the on position and the lock button pushes the operator portion, pivoting the actuator portion about the mid portion to bias the locking portion of the plunger out of one of said plurality of slots of the outer assembly when the lock button is positioned in the off position.

13. The fishing reel of claim 12 wherein the operator portion of the lever defines a slot and the lock button includes a laterally extending pin disposed within the slot of the operator portion.

14. The fishing reel of claim 9 wherein the operator portion of the plunger defines a slot having front and rear surfaces and the actuator means includes a lever having an actuator portion which is engageable with the front and rear surfaces for biasing the plunger between the lock and unlock positions.

15. A switchable anti-reverse mechanism for a fishing reel having a line storing element and line winding means for winding fishing line in one direction onto the line storing element, the line winding means including a rotor engageable with the fishing line and rotatable around the line storing element, a hand crank, and a pinion for transmitting motive power from the handcrank to the rotor, the pinion defining a pinion axis, the anti-reverse mechanism comprising:

an inner assembly adapted for fixedly mounting to the pinion of the fishing reel, the inner assembly having a front end portion adapted for mounting to the rotor of the fishing reel;

an outer assembly having a housing defining a plurality of slots and a cylindrical member defining a longitudinally extending opening and having a member axis, said member axis being substantially parallel with the pinion axis when said inner assembly is mounted to the pinion and said front end portion is mounted to the rotor, the inner assembly being disposed within the opening of the outer assembly unidirectional rotation means disposed intermediate the inner and outer assemblies for allowing relative rotation around the member axis between the inner and outer assemblies in the one direction and preventing relative rotation between the inner and outer assemblies in a reverse direction which is opposite to the one direction;

a plunger defining a plunger axis which is parallel to the member axis, the plunger being movable along the plunger axis from a lock position to an unlock position, wherein at least a portion of the plunger is disposed within one of said plurality of slots of the outer assembly when the plunger is in the lock position and no portion of the plunger is disposed within one of said plurality of slots of the outer assembly when the plunger is in the unlock position; and actuator means engaged with the plunger for selectively moving the plunger between the lock position and the unlock position.

* * * * *